United States Patent Office 3,421,323
Patented Jan. 14, 1969

---

3,421,323
FLUID FUEL AND NON-FLUID OXIDIZER ENERGY GENERATION METHOD
Donald Perry Bennett, Jr., Diamond Bar, Calif., assignor of one-half to Martin E. Gerry, Santa Ana, Calif.
Continuation-in-part of application Ser. No. 480,080, Aug. 16, 1965. This application Nov. 14, 1966, Ser. No. 611,188
U.S. Cl. 60—220  9 Claims
Int. Cl. F23r *1/02;* C06d *5/00*

---

ABSTRACT OF THE DISCLOSURE

This disclosure deals with the use of certain compounds of fluid fuels in combination with oxidizing compounds in hypergolic combination to create heat and energy. The oxidizing compounds are of non-fluid character while the fuels are of fluid character. Uses of this energy source include propulsion systems, power generation means, and flame-out devices for aircraft.

---

This application is a continuation-in-part of application Ser. No. 480,080, filed Aug. 16, 1965, now abandoned.

The present invention relates to a novel energy source due to the utilization of a fluid-fuel in combination with a non-fluid-oxidizer.

One advantage of this combination is the handling, storing, and using capabilities of this combination. Fluid-fuels are easily loaded and stored in a container structure and readily replenishable, whereas non-fluid-oxidizer may be permanently stored in another compartment of the container structure until the energy source is ready for use.

Another advantage of this combination is that either or both the fluid-fuel and non-fluid-oxidizer may be replaced, thereby making the energy source container structure and its related parts reusable.

Still another advantage, is that this combination comprises a fluid-fuel and a non-fluid-oxidizer which are hypergolic, thereby causing fuel ignition upon contact of the fluid-fuel with the non-fluid-oxidizer.

Examples of types of fluids that may be used as fuels which are categorized as elements and include hydrogen, sodium, or potassium; categorized as gases and include acetylene or hydrogen; categorized as liquids and include alcohol, gasoline, jet petroleum, rocket petroleum; categorized as viscous substances and include diesel fuel or napalm; categorized as plastic substances and include sodium, potassium, or paraffin.

Examples of types of non-fluids that may be used as oxidizers which are categorized as an element is iodine; categorized as chemical compounds are chromium trioxide or chromic acid anhydride.

Experiments were performed by the inventor at Stamford, Conn., where one experiment constituted a propellant feasibility demonstration, wherein ethyl alcohol reacted with chromium trioxide upon contact with each other demonstrating a hypergolic reaction. Another experiment was performed by the inventor, reusing the container structure wherein ethyl alcohol was injected through a flexible pipe connected to a combustion chamber which chamber was loaded with chromium trioxide. Hypergolic action occurred, smoke and flame were expelled accompanied by loud noises indicating vigorous chemical reaction internal to the chamber in the container structure, and power was developed.

Chromium trioxide oxidizer was used with ethyl alcohol fuel inasmuch as chromium trioxide is a vigorous oxidizing agent that causes spontaneous combustion of the ethyl alcohol fuel hypergolically.

The reaction that occurred may be described by the following equation which shows a non-reversible chemical reaction:

$$2C_2H_5OH + 3CrO_3 \rightarrow CO_2 + 3CO + 6H_2O + 3Cr$$

The substances of the oxidizer group above mentioned are each high energy containing substances and therefore during a combination with any of the aforesaid fuels are combinable in a hypergolic reaction.

In the experiments involving the reaction products of carbon monoxide, carbon dioxide, and water or steam thus formed were at extremely high temperatures, and possibly the element chromium which had been reduced from the oxides of chromium, were exhausted. The water formed was also exhausted, but being at a high temperature the water was in the form of superheated steam. It is therefore reasonable that one important application of this energy source could be in the use as a means for driving the blades of a turbine due to the high energy exhaust products ejected from a nozzle or similar ejection means. Another application being as a self-contained propulsion device wherein again the high energy exhaust products through the ejection means are used to drive the device which could be a rocket or auxiliary jet rocket for use in aircraft or for use in other rockets either to restart those rocket or jet engines upon flame-out or for assistance in takeoff or temporary increases in specific impulse of these rockets or aircraft. Application to any type of transportation craft 400 is possible and these craft may include missiles, water surface craft such as ships, underwater surface craft such as submarines, as well as space craft. Under conditions of combination of any of the aforesaid fuels and oxidizers, the chemical reaction occurs without the aid of any auxiliary igniter devices. This type of ignition reaction is known as a hypergolic reaction.

One form of the invention is related, and may be understood by a detailed description together with the accompanying drawing in which.

Figure 1:
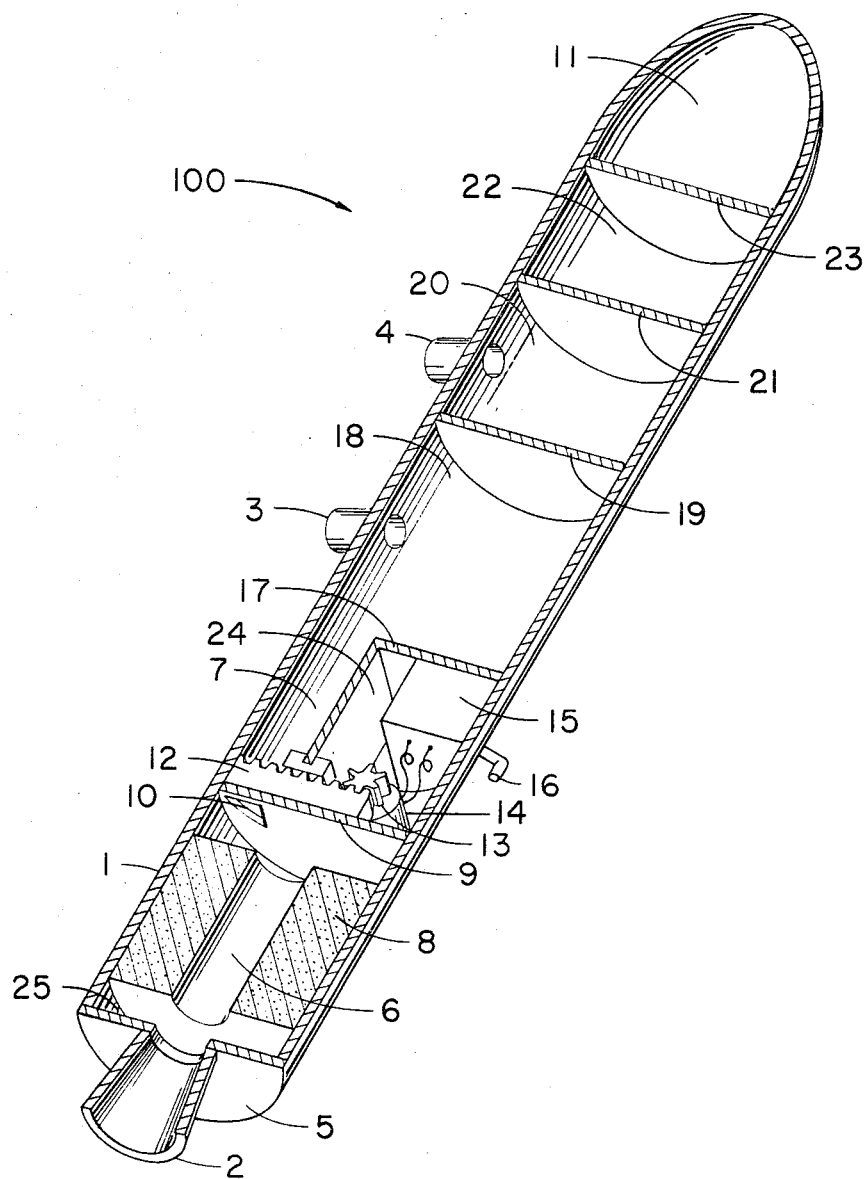
FIGURE 1 is a three dimensional view, partially in cross-section of an energy source utilized as a propulsion vehicle in accordance with this invention.
Figure 2:
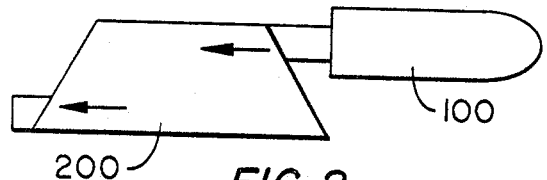
FIGURE 2 is a plan view showing the energy source coupled to a turbine which includes an electrical power generator.
Figure 3:
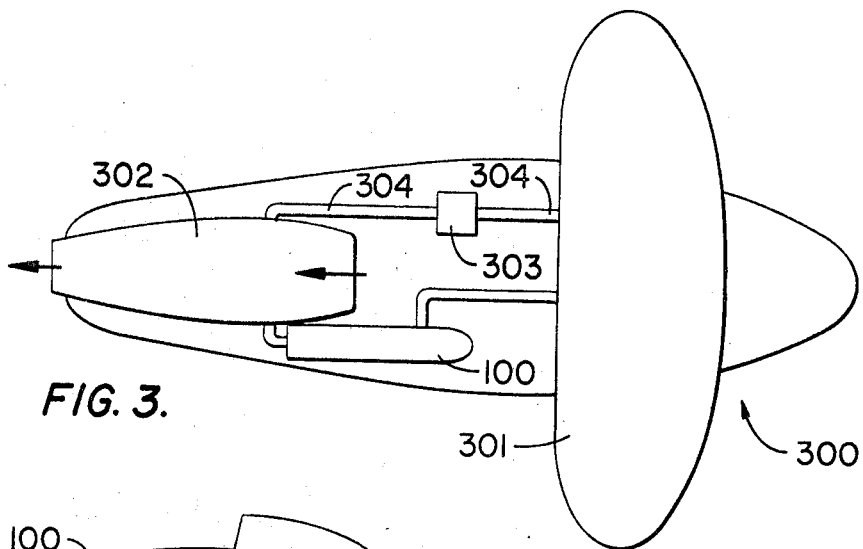
FIGURE 3 is a plan view of a jet aircraft showing the energy source coupled to the jet engine for use in fuel conditioning, autoignition, flame-out proofing, and as an auxiliary power means.
Figure 4:
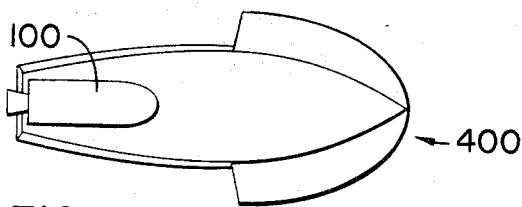
FIGURE 4 is a plan view of a propulsion vehicle showing the energy source installed as an integral part thereof for propelling the vehicle.
Figure 5:
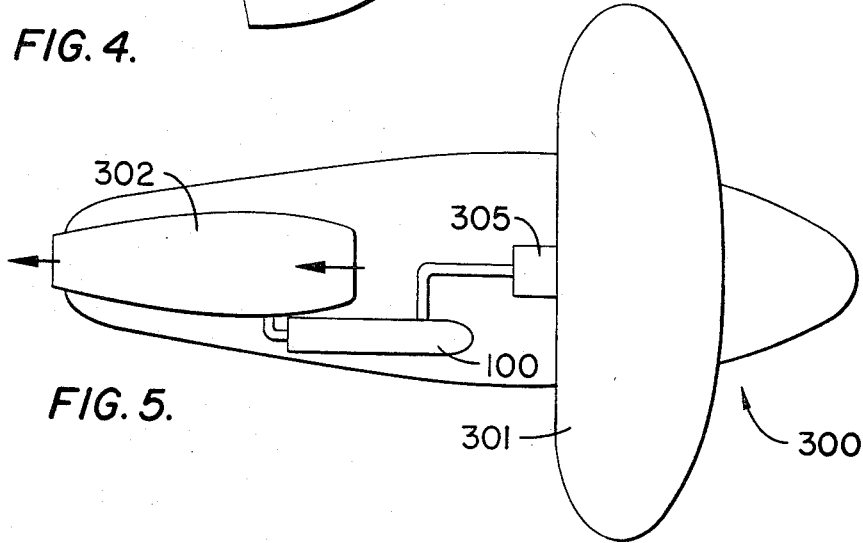
FIGURE 5 is a plan view of a jet aircraft showing means for injecting fuel into the energy source and the coupling of the energy source to a jet engine for conditioning of the fuel prior to injection into the jet engine.

Referring to FIGURES 1, 2, 3, 4, and 5, container structure 1 has nozzle 2 mechanically attached to base 5, and base 5 has an aperture at its center through which the ignited fuel gasses exhaust. Fuel loading port 3 is used for loading the fluid fuels by connecting a pipe from an external fuel storage tank. On completion of loading, fuel port 3 is mechanically sealed. The fuel is retained in fuel reservoir 18 and in fuel entry chamber 7. Port 4 is used for loading a compressed gas into gas pressurizing chamber 20 by connecting a pipe from an external pressure vessel and port 4 is thereafter mechanically sealed. Solid oxidizer 8 has a cylindrical aperture 6 along the length of its axis for providing a path for the fluid fuel to flow through and facilitate thorough hypergolic action, is located in oxidizer compartment 25 of container structure 1. Valve seat 9 has an aperture 10 which aperture 10 is normally blocked by valve gate control rack 12. Teeth of pinion 13 always cooperate with and engage teeth of rack 12, and pinion 13 is mechanically attached to shaft of valve control motor 14 for controlling the quantity of fuel flowing through aperture 10 by means of automatic valve control mechanism 15 to which the valve control motor 14 is electrically connected. The automatic valve control mechanism 15 is located in control mechanism compartment 24, which compartment is enclosed by means of control compartment enclosure 17 and said mechanism 15 is remotely controlled by means of radio command signals impressed upon remote control antenna 16 electrically connected to a communications link which is an integral part of the said automatic valve control mechanism 15 and which communications link translates the received signals into commands which activates the said automatic valve control mechanism 15 thereby controlling the fuel flow. Command signals may be optionally manually provided by means of a hard line electrical connection between automatic valve control mechanism 15 and a control means located in cabin 22, manually operated by a human being in the case where the propulsion vehicle is a manned flight vehicle. The propulsion vehicle has payload chamber 11 in which particular payloads are retained, and fixed separator wall 23 between cabin 22 and payload chamber 11 is mechanically affixed to the wall of container structure 1. Fixed separator wall 21 between gas pressurizing chamber 20 and cabin 22 is mechanically affixed to wall of container structure 1. Movable separator piston disk 19 is located between fuel reservoir 18 and gas pressurizing chamber 20, the edges of disk 19 cooperating with the wall of container structure 1 and movable in a piston-like fashion when a pressure differential between fuel reservoir chamber 18 and gas pressurizing chamber 20 exists.

When a command signal is given to activate the automatic valve control mechanism 15 thereby applying power means to valve control motor 14 which rotates pinion 13 counterclockwise, teeth of pinion 13 cooperating with teeth of rack 12 cause rack 12 to be translated to a given distance from its normally aperture 10 blocking position, thereby permitting fluid-fuel to flow through aperture 10 due to pressure differential between compartments 18 and 20, causing piston 19 to be moved, and forcing fluid-fuel through into aperture 6 of solid or non-fluid oxidizer 8, and ignite the fluid-fuel hypergolically, and cause a chemical reaction to occur at high temperatures, and expending of energy to occur, and as hereinabove described causing violent combustion, and an exhaust plume through nozzle 2 to propel the vehicle by virtue of the thrust developed.

The solid or non-fluid-oxidizer used in the illustrated embodiment of this invention is chromium trioxide ($CrO_3$), and the fuel used in the illustrated embodiment of this invention is ethyl alcohol ($C_2H_5OH$) in combination with each other to cause ignition hypergolically. As described above, the chemical reaction yields chromium (Cr), carbon monoxide (CO), carbon dioxide ($CO_2$), and water ($H_2O$).

Instead of exhausting through the nozzle, the energy source 100 above described may be used equally effectively as a power generator by piping the exhaust gasses directly from the aperture at the center of base 5, into which the above mentioned nozzle is mechanically inserted and held, to a turbine 200 or other power or prime moving means to drive turbine or other power or prime moving means.

The application of the energy source to jet fuel conditioning for use in conventional jet engines or similarly powered vehicles of all types effects two distinct improvements in the operation of these vehicles, namely, fuel performance and fuel consumption are markedly improved and the engine is rendered flame-out-proof. Inasmuch as the fuel is hypergolic with air, autoignition is spontaneous and automatic even during flame-out conditions. An additional safety feature which is quite unique in this application is that even though the fuel is hypergolic with air when it leaves the injector within the said vehicle, it is non-hypergolic and quite conventional when in the fuel tanks and lines. The basic principle of fuel conditioning involves the use of the energy source which raises the temperature of the fuel to the point at which it is hypergolic with air and needs no other ignition device, electrical, pyrotechnic, hot wire, or similar ignition device. The flow rate of the jet fuel is adjusted to provide the proper temperature with the minimum consumption of fuel in the energy source chamber. Tailoring of the oxidizer grain geometry to provide the proper flow pattern may also be required in this application. It is anticipated that no more than 10 percent of the fuel entering the chamber would be oxidized, but it should be emphasized that this consumption is not a loss because the heat energy produced is absorbed by the unburnt fuel and injected with it into the combustion chamber of the jet engine to do useful work. It should be obvious that, after conditioning, the fuel will burst into flame upon contact with air and so leaks cannot be tolerated between the energy source and the jet fuel injector. Fortunately, this fact is consonant with the desirability of minimizing line length between the energy source and the injector of jet fuel 305 to minimize losses. The non-fluid-oxidizer is of course consumed during this application as a fuel conditioner, but the particular oxidizer component used lends itself to storage and handling as long as simple precautions are respected. Oxidizer grains would be replaced in the chamber during refueling operations and different sized grain segments could be used to tailor the charge to the specific vehicle mission.

Another way of stating the application of jet fuel conditioning more simply, is that jet fuel is stored in the wing storage tank 301 of an aircraft 300 and is relatively safe because although being flammable, it is stored at a temperature below its ignition temperature or flash point, and is also stored relatively isolated from air. The jet fuel is then pumped to the jet engine 302. The jet engine is specially designed with the energy source of this invention as part of the fuel injector. When the jet fuel enters the energy source, it reacts with the oxidizer. About ten percent of the above stated fuel components reacts hypergolically with the oxidizer within the combustion chamber of the energy source. This produces heat which is absorbed by the remaining 90 percent of the fuel component, elevating the temperature of the said fuel component in combination with the oxidizer component, and hence the reaction products produced thereby, to a temperature which is well above the ignition temperature of the said fuel or flash point. At this point, the hot mixture of fuel and combustion products are injected into the combustion chamber of the jet engine and therein is mixed with air. Since the temperature of the mixture thus formed is already above the ignition point or flash point, ignition takes place substantially instantaneously and automatically. This action is referred to as autoignition. Therefore, no auxiliary igniter such as a sparkplug, squib, hot wire, pyrotechnic device, or auxiliary ignited gas jet is necessary for ignition of the fuels within the combustion chamber of the jet engine.

In the event that flight conditions of the jet aircraft do not require continuous fuel conditioning to sustain the combustion conditions of the jet engine, fuel may be conducted directly to the jet engine fuel injector by means of a by-pass valve 303 connected between segments of by-pass line 304. The said energy source is then used to start the jet engine or to restart the engine in the event of the extinguishing of the combustion in the jet engine or flame-out.

Continuous usage of the said energy sources in the jet engine makes possible flights of the jet aircraft at high speed and low altitudes without the necessity of complex adjustments to the jet aircraft engine so as to avoid occurrence of flame-out. Conversely, the said energy source is also applicable in a similar manner to jet aircraft for low speed and high altitude flights.

In the main, the importance and novelty of this invention is one of the major features embodied in the use of a solid oxidizer which reacts hypergolically with fluid fuels, and therefore does not require additional ignition devices, ignition occurring automatically on contact of the fluid fuel with the non-fluid oxidizer.

Although the embodiment particularly illustrated the use of a solid or non-fluid oxidizer and a fluid-fuel, any non-fluid oxidizer which may be categorized as an element, a chemical compound, a plastic substance, or any solid substance may be used in combination with any fluid-fuel that may be categorized as an element, a gas, a liquid, a viscous substance, or a plastic substance which is hypergolic with the non-fluid oxidizer.

What I claim is:

1. In a means for generating a prime source of energy comprising a combustion chamber and a reaction product ejection means, the steps of
   providing a non-fluid mass of oxidizer component which is retained in said combustion chamber,
   injecting a fluid fuel component in said combustion chamber which combines with the said non-fluid mass oxidizer component in a hypergolic reaction thereby producing high temperature gases as reaction products of said hypergolic reaction, and
   passing of the said reaction products thus formed through the said ejection means to produce thrust.
2. The method of generating a prime source of energy as in claim 1, wherein
   the non-fluid mass oxidizer component is selected from the group consisting essentially of iodine, chromium trioxide and chromic acid anhydride, and
   the fluid fuel component is selected from the group consisting essentially of hydrogen, sodium, potassium, acetylene, diesel fuel, paraffin, alcohol, gasoline, jet petroleum, rocket petroleum and napalm.
3. The method as in claim 1, in combination with the step of
   propelling a vehicle, the said combustion chamber and reaction product ejection means providing propulsion.
4. The method as in claim 1, in combination with the step of
   employing at least a portion of said reaction products thus formed to drive a turbo generator for the production of electrical power.
5. The method as in claim 1, in combination with the step of
   providing aircraft propulsion power by means of the said thrust produced.
6. The method set forth in claim 1 including the further step of injecting said reaction products into an air-breathing jet engine for pyrophoric ignition of any unburned fuel contained in said reaction products.
7. The method as set forth in claim 1, wherein
   the non-fluid mass oxidizer component is selected from the group consisting essentially of chromium trioxide and chromic acid anhydride, and
   the fluid fuel component is selected from the group consisting essentially of hydrogen, sodium, potassium, acetylene, diesel fuel, paraffin, alcohol, gasoline, jet petroleum, rocket petroleum and napalm.
8. The method as set forth in claim 1, wherein
   the non-fluid mass oxidizer component is selected from the group consisting essentially of chromium trioxide and iodine, and
   the fluid fuel component is selected from the group consisting essentially of hydrogen, sodium, potassium, acetylene, diesel fuel, paraffin, alcohol, gasoline, jet petroleum, rocket petroleum and napalm.
9. The method as set forth in claim 1, wherein
   the non-fluid mass oxidizer component is selected from the group consisting essentially of chromic acid anhydride and iodine, and
   the fluid fuel component is selected from the group consisting essentially of hydrogen, sodium, potassium, acetylene, diesel fuel, paraffin, alcohol, gasoline, jet petroleum, rocket petroleum and napalm.

References Cited
UNITED STATES PATENTS

| | | | |
|---|---|---|---|
| 3,130,672 | 4/1964 | Webb | 60—39.47 X |
| 3,136,119 | 6/1964 | Avery | 60—220 |
| 3,158,994 | 12/1964 | Hodgson | 60—220 |
| 3,178,885 | 4/1965 | Loughran | 60—251 |

CARLTON R. CROYLE, *Primary Examiner.*

U.S. Cl. X.R.

60—251, 39.47, 261; 149—109